INVENTOR.
JOHN T. KRAPP
BY J. A. Grier
ATTORNEY

Jan. 28, 1958    J. T. KRAPP    2,821,413
QUICKLY SEPARABLE COUPLING FOR CONDUITS AND THE LIKE
Filed Sept. 14, 1954    4 Sheets-Sheet 2

INVENTOR.
JOHN T. KRAPP
BY *J. A. Grier*
ATTORNEY

Jan. 28, 1958   J. T. KRAPP   2,821,413
QUICKLY SEPARABLE COUPLING FOR CONDUITS AND THE LIKE
Filed Sept. 14, 1954   4 Sheets-Sheet 3

INVENTOR.
JOHN T. KRAPP
BY
ATTORNEY

Jan. 28, 1958　　　　　J. T. KRAPP　　　　　2,821,413
QUICKLY SEPARABLE COUPLING FOR CONDUITS AND THE LIKE
Filed Sept. 14, 1954　　　　　　　　　　　　4 Sheets-Sheet 4

INVENTOR.
JOHN T. KRAPP
BY
ATTORNEY

United States Patent Office 2,821,413
Patented Jan. 28, 1958

2,821,413

QUICKLY SEPARABLE COUPLING FOR CONDUITS AND THE LIKE

John T. Krapp, Port Washington, N. Y.

Application September 14, 1954, Serial No. 455,894

2 Claims. (Cl. 285—18)

This invention relates to improvements in separable couplings and is directed more particularly to a single coupling device which is secured on one conduit, such as a pipe for example, said coupling device carrying generally tubular resilient means secured thereto in fluid tight relation and adapted to be stretched axially, said device being adapted to be engaged in fluid tight relation with a second conduit, which might also be a pipe.

One object of the invention is the provision of a coupling device which, for example may be carried on a movable or dirigible conduit, and carrying a tubular sealing element which is particularly adapted to be attached in a fluid tight relation to the free end of a second conduit.

Another object of the invention is the provision of a single coupling device carried on one conduit and having a generally tubular rubber-like membrane thereon, said device being adapted to be inserted into the open end of a second conduit to establish a fluid tight seal with said second conduit.

A further object of the invention is the provision of a single unit coupling device carried on a first conduit and adapted to have the end of a second conduit inserted into it for forming therewith a fluid tight seal.

Yet another object of the invention is the provision, in a tubular coupling member, of a generally tubular seal element, formed of rubber or other stretchable material, one end of said member being connected in fluid tight relation to a stationary part of said member, and the other end of said element being connected in fluid tight relation to a movable part of said member, and means to move said last part axially to stretch and elongate said seal member before inserting it into a pipe to which it is to be coupled.

A further object of the invention is the provision, in a coupling device, of a single coupling member, a stretchable tubular element carried thereby, and means to effect the stretching or the collapsing of said element for detachably engaging said member in fluid tight relation with the free end of a conduit.

Yet another object of the invention is the provision in a coupling device of a single coupling member, a stretchable tubular element carried thereby and adapted to be detachably engaged in fluid tight relation with the inner wall of a conduit adjacent to the free end thereof and means to effect the stretching or the collapsing of said element for disengaging and engaging said member as aforesaid.

Yet another object of the invention is the provision in a coupling device of a single coupling member, a stretchable tubular element carried thereby and adapted to be detachably engaged in fluid tight relation with the outer wall of a conduit adjacent to the free end thereof and means to effect the stretching or the collapsing of said element for disengaging and engaging said member as aforesaid.

Other objects and advantages of the invention will become apparent to those skilled in the art upon the study of this specification and the accompanying drawings.

Referring to the drawings which are given by way of example to illustrate the invention:

Figures 1, 2:
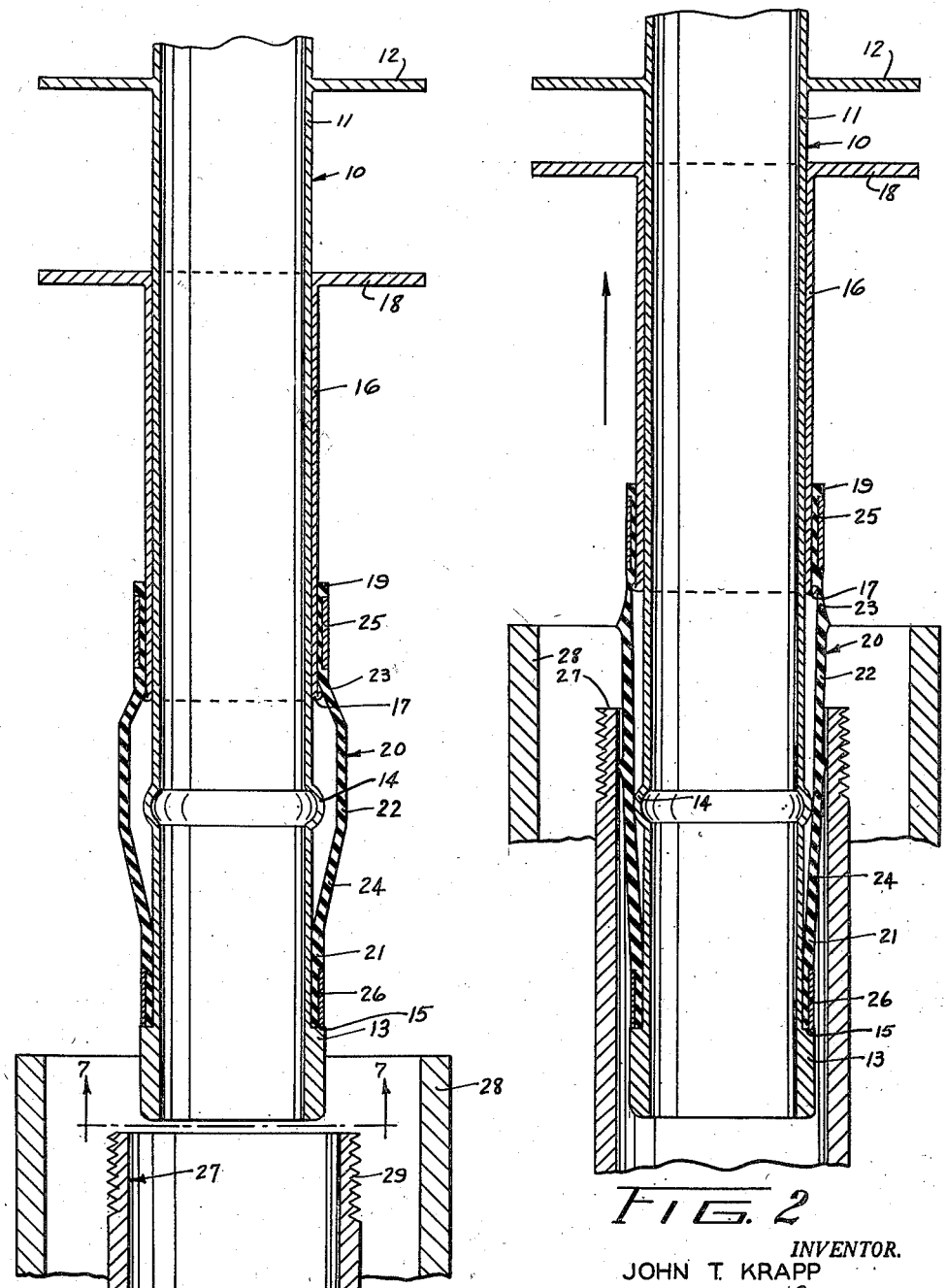
Figure 1 is a sectional elevational showing a conduit or pipe within a ground box and a conduit therein to which my new and improved single coupling device (also shown in section), is to be attached.
Figure 2 is a sectional elevation similar to Figure 1 showing my coupling device with a stretchable element thereon extended or stretched and inserted in the open end of the conduit.

In many instances, a pipe or conduit is more or less accessible, one example, for example, being wherein a pipe or conduit extends upwardly into a ground box, and terminates substantially below the upper surface thereof.

According to my invention a single coupling member having an expandable and contractable member adapted to engage the pipe or conduit and to effect a fluid tight seal therewith. In one form of the invention, the engagement is with the interior wall of the conduit, and in another form, the engagement is with the exterior wall.

In connection with the former, reference is made to Figures 1, 2, 3 and 7, wherein a tubular member 10 has a straight body portion 11 of substantially uniform diameter from a flange portion 12 to a portion 13, where the wall has been substantially thickened, the purpose of which will be presently described.

Spaced apart in the tubular wall 11 from the shoulder 15 formed between the thinner wall and the thicker wall is a bead 14 which extends outwardly from the said tubular wall. Reciprocally carried on the wall of the portion 11 between the flange 12 and the bead 14 is a tubular member 16, the lower end of which is reinforced or strengthened in any suitable manner, for example by spinning a solid bead 17 on the lower end thereof. The other end has a flange 18 formed on the other end thereof.

A stepped tubular expansible and contractable member 20 has a straight tubular portion 19 which fits on the tubular member 16 and a tubular portion 21 which is spaced apart from the portion 19 and which fits on the tubular portion 11 adjacent to the shoulder 15. Intermediate the portions 19 and 21 and larger than either of them is a straight portion 22. Joining the portions 19 and 22 together is a tapered portion 23, while joining the portion 22 to the portion 21 is a tapered tubular portion 24. The portions 19, 23, 22, 24 and 21 are all preferably formed integral with each other to form a single member, for example by molding it.

A strap clamping member 25 embraces the portion 19 and clamps it into fluid tight relation with the outer wall of the tubular member 16. Likewise a similar clamping member 26 clamps the portion 21 in fluid tight relation to the tubular wall 11.

The conduit may, for example, be the threaded end 29 of a pipe 27 which is positioned in and below the upper level of a ground box 28.

The user with his fingers urges the flanges 12 and 18 toward each other until a position such as that shown in Figure 2 is obtained and the deformable element 20 has been elongated and stretched so that the temporarily resultant diameter is a minimum. With the coupling member in this state, the end 13 is inserted into the open end of the pipe 27 and is pushed down to a point where the beaded portion 14 is substantially below the upper open end of the pipe 27 then the flanges 12 and 18 are released and the coupling assumes the position shown in Figure 3.

Figure 3:
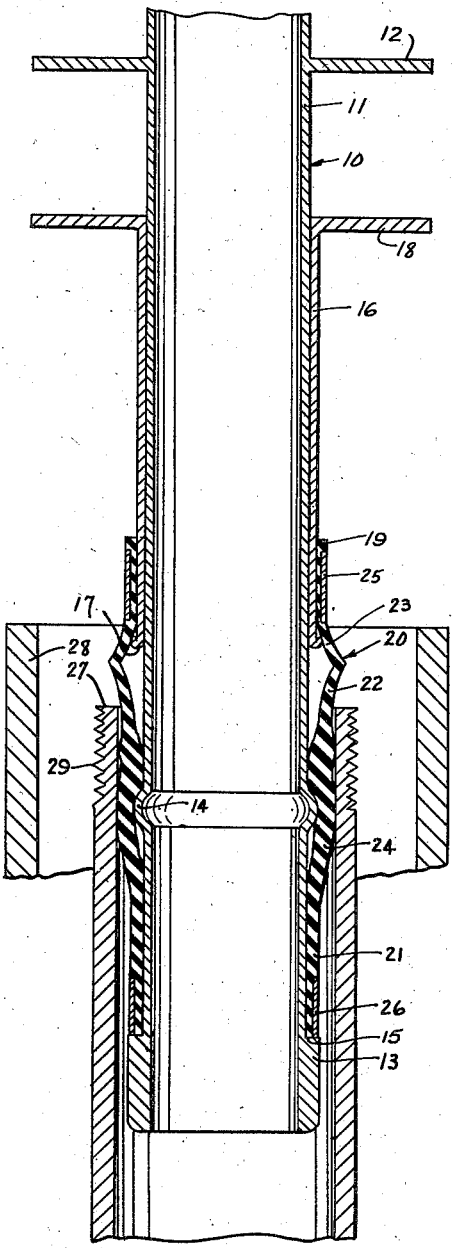
Figure 3 is a view similar to Figure 2 except that the stretchable element has been released so that it assumes its natural or thicker state.
Figure 4:
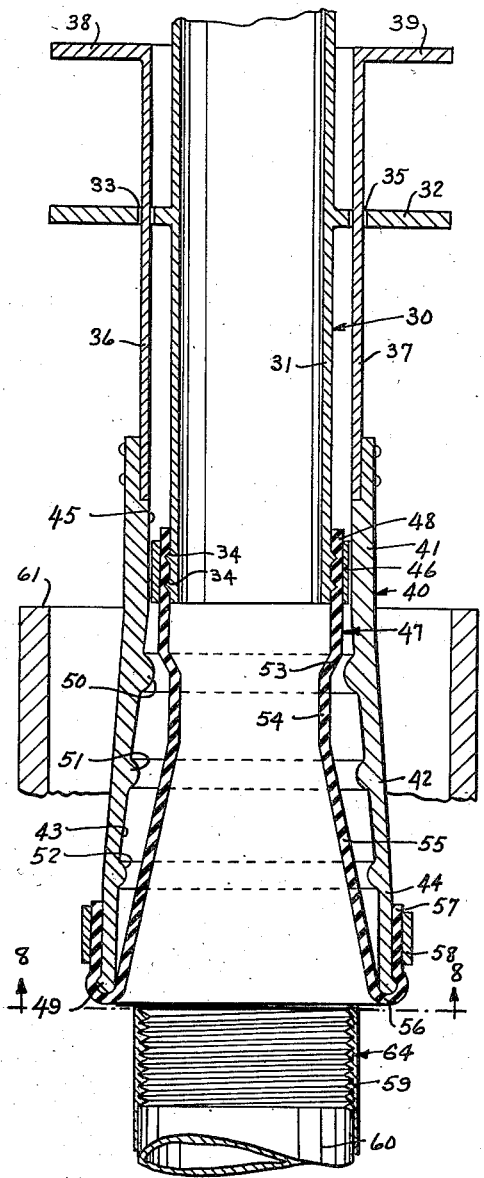
Figure 4 is a sectional elevation of a conduit over which the open end of a modified form of my new and improved coupling is to be applied.

It will be noted that when the coupling 10 is in the position shown in Figure 3, the expansible contractable member 20 has contracted, and under tractile forces inherent in the member 20, effects and maintains a fluid tight seal between the coupling and the interior wall of the conduit or pipe 27. This is accentuated by the presence of the annular bead 14, and the seal between the coupling and the interior wall of the conduit will be maintained for a very long period of time or until they are separated.

When it is desired to separate the coupling from the conduit, the operator merely grasps the upper surfaces of the flange 12 oppositely by the fingers of both hands and oppositely engaging the lower surface of the flange 18 with his thumbs, the flanges 12 and 18 are urged toward one another, thereby elongating the member 20 and at the same time reducing its diameter so that it may be freely disengaged from the conduit 27.

Referring now to Figures 4, 5, 6 and 8, a tubular member 30 has a straight tubular portion 31, and an annular flange means 32 is formed integral therewith or is welded or otherwise united therewith. The flange means 32 has oppositely disposed arcuate slots 33, 35 formed therein. Formed near the lower end of the member 30 are spaced apart annular beads or protrusions 34, the purpose of which will be presently described.

The flange 32 has opposite preferably arcuate slots 33 and 35 formed therein through which the shanks 36 and 37, respectively, extend. These shanks have on their upper ends, flange portions 38 and 39 respectively, which are spaced from the flange 32 so as to be conveniently grasped between the thumb and the fingers of both hands of an operator conjointly as will presently be described.

The coupling member also includes a socket member 40, which has a straight annular wall section 41 of such diameter that its interior wall surface 45 clears or forms a free working fit on an annular sealing band 46 which maintains one end 48 of an expandable and contractable member 47 in fluid tight relation to the end of the straight tubular portion 31. The fluid tight relation is maintained by the band 46 positively clamping the end 48 to the tubular portion and to the annular beads 34.

The socket member 40 has a tapered portion 42 and this is joined by a larger tubular end portion 44 terminating in an annular lip 49.

Formed integral with the inner wall 43 of the tapered portion 43 is a series of annular beads 50, 51 and 52. These beads are spaced apart from each other along the wall 43, and since the wall is tapered, the beads are of different diameters, and preferably the mass of material in the several beads is greater as the diameter decreases.

The expandable and contractable member 47 has a zone 53 joining the straight portion 48 and this zone extends inwardly along an angle to join a straight portion 54 of smaller diameter than the straight portion 48. Joining the portion 54 is a tapered portion 55 which tapers outwardly from the portion 54 to the annular tip 49 on the member 40 and it has a curved portion 56 which extends over or spans the lip 49 and terminates in an annular band portion 57 which closely hugs the exterior surface of the portion 40 immediately about the lip 49, and this is maintained in fluid tight relation with the member 40 by means of an annular clamping element 58. A pipe 60 has threads 59 thereon and this pipe is positioned in a ground box 61 so that it is comparatively inaccessible. The threads 59 may be provided with a protective internally threaded sleeve 64. Now, when it is desired to couple to the pipe 60, the flange-like elements 38, 39 and 33, 32, respectively, are pressed toward each other, thereby stretching the expandable contractable element 47 so that it has an appearance somewhat like that shown in Figure 5. This coupling member is then pressed over the free end of the pipe 60 and the sleeve 61 thereon while the element 47 is expanded and stretched, thereby enabling the coupling to be freely applied over said end.

Figures 5, 6:
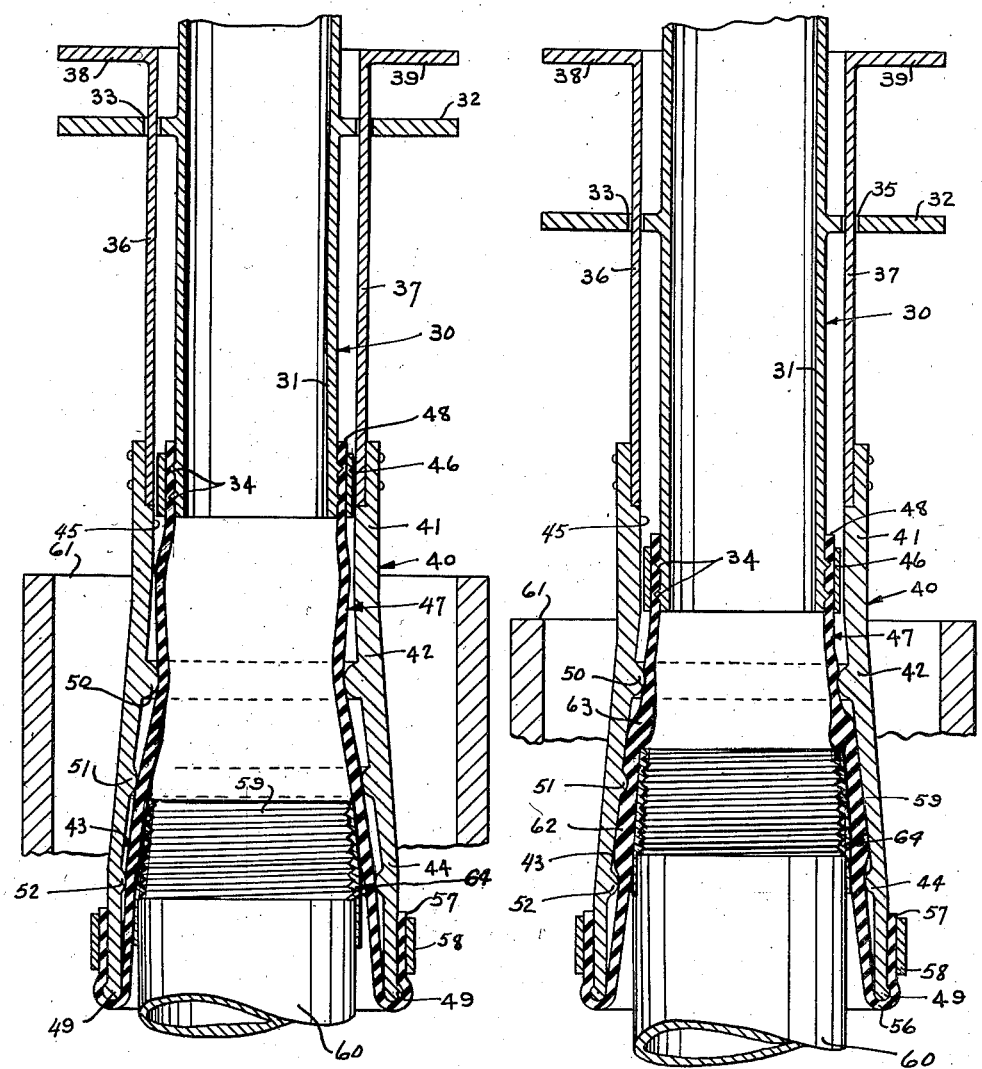
Figure 5 is a sectional elevation similar to Figure 4 wherein the stretchable element has been stretched and the coupling has been applied over the free end of the conduit.
Figure 6 is a view similar to Figure 5 except that the stretchable element has been released and thereby a fluid tight seal is effected between said coupling member and the conduit.
Figure 7:
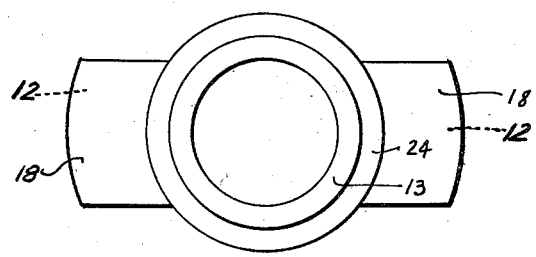
Figure 7 is an end elevation as seen along the line 7—7 of Figure 1.
Figure 8:
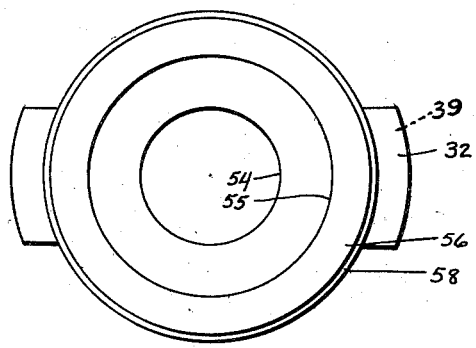
Figure 8 is a view taken along the line 8—8 of Figure 4.

Then the flanges are released and the expandable contractable element 47 assumes a position somewhat like that shown in Figure 6 wherein it intimately and in a fluid tight manner embraces the outer surface of the sleeve and the pipe 60 and any fluid under pressure passing therethrough will not leak until the flanges are moved toward each other again, thereby stretching the element 47 and allowing the device to be freely removed from the pipe 60.

The reason why I can get such a positive seal with the above described arrangement is that when the device is pushed over the end of a conduit or pipe with the element 47 in a stretched state, the device of course can go further on than it could if the element 47 were not stretched. Now when the flange-like members are released, the rubber-like element 47 has a portion 62 in which the rubber or the like is thicker than normal due to the fact that some of it cannot flow between the annular head 52 and the pipe and this rubber not only engages the annular bead but also the side and end surfaces of the sleeve 64. Spaced apart from the annular bead 52 is the second annular bead 42 which together with the adjacent pipe threads prevents some of the rubber in a zone 63 which intimately contacts the inner wall of the member 40 and the upper end of the pipe 60 and thereby a double seal is effected.

I have found that both forms of the device herein shown and described are efficient, easy to operate and that they form seals which will hold at pressures much in excess of the pressures employed in apparatus to which they are to be coupled.

Although I have herein shown and described by way of example both male and a female coupling members to illustrate the invention, it is obvious that many changes may be made in the arrangements shown and described without departing from the spirit of the invention as set forth in the following claims.

I claim:

1. In a coupling device of the character described, a pair of coaxial tubular bodies, one of which is movable axially relative to the other, the extremity of one of said bodies being spaced apart axially from the extremity of the other, the inner of said bodies being tubular in form and the outer of said bodies having a straight tubular portion which joins the small end of a conical portion and the outer extremity of said conical portion constituting the point of largest diameter, a generally tubular diaphragm of deformable material having one end connected in fluid tight relation to the extremity of said inner body and having its other end connected in fluid tight relation to the large extremity of the outer member, and separate means on said bodies for moving them in directions to stretch said diaphragm prior to placing said coupling in engagement with a conduit to which said device is to be coupled, whereby the contraction of said diaphragm, when said separate means is released, effects a fluid tight connection between said device and said conduit.

2. In a coupling device of the character described, a pair of coaxial tubular bodies, one of which is movable axially relative to the other, the extremity of one of said bodies being spaced apart axially from the extremity of the other, the inner of said bodies being tubular in form and the outer of said bodies having a straight tubular portion which joins the small end of a conical portion and the extremity of the outer portion constituting the large end and consequently the point of largest diameter, said conical portion having a series of annular beads formed therein in spaced apart relation, a generally tubular diaphragm of deformable material having one end connected in fluid tight relation to the extremity of said inner body and having its other end connected in fluid tight relation to the large extremity of the outer member, and separate means on said bodies for moving them in directions to stretch said diaphragm prior to placing said coupling in engagement with a conduit to which said device is to be coupled, whereby the contraction of said diaphragm when said separate means is released, effects a fluid tight connection between said device and said conduit.

References Cited in the file of this patent
UNITED STATES PATENTS

| | | |
|---|---|---|
| 49,903 | Martin | Sept. 12, 1865 |
| 196,867 | Besnard | Nov. 6, 1887 |
| 545,733 | Schmidt | Sept. 3, 1895 |
| 590,590 | Prevet | Sept. 28, 1897 |
| 612,676 | Rife | Oct. 18, 1898 |
| 1,081,299 | Franklin | Dec. 16, 1913 |
| 2,594,285 | Brace | Apr. 29, 1952 |